(12) United States Patent
Zhang et al.

(10) Patent No.: US 12,128,867 B2
(45) Date of Patent: Oct. 29, 2024

(54) COMFORT BRAKE CONTROL SYSTEM AND CONTROL METHOD FOR VEHICLE TECHNICAL FIELD

(71) Applicant: Robert Bosch GmbH, Stuttgart (DE)

(72) Inventors: Ying Zhang, Suzhou (CN); Chongxi Huang, Suzhou (CN); Renrui Wang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/332,275

(22) Filed: Jun. 9, 2023

(65) Prior Publication Data

US 2023/0406275 A1   Dec. 21, 2023

(51) Int. Cl.
   *B60T 8/172*   (2006.01)
   *B60T 7/12*    (2006.01)
   (Continued)

(52) U.S. Cl.
   CPC ............ *B60T 8/172* (2013.01); *B60T 7/12* (2013.01); *B60T 8/17555* (2013.01); *B60T 8/321* (2013.01); *B60T 8/3275* (2013.01); *B60W 10/18* (2013.01); *B60W 40/105* (2013.01); *B60W 50/0098* (2013.01); *B60W 50/085* (2013.01); *B60T 2220/02* (2013.01);
   (Continued)

(58) Field of Classification Search
   CPC ........ B60T 8/172; B60T 7/12; B60T 8/17555; B60T 8/321; B60T 8/3275; B60T 2220/02; B60T 2250/04; B60W 2520/10; B60W 2710/182; B60W 10/18; B60W 40/105; B60W 50/0098; B60W 50/085; B60Y 2400/81
   See application file for complete search history.

(56) References Cited

U.S. PATENT DOCUMENTS 3,132,599 A * 5/1964 Wengatz ................. B61B 13/04
                                                    105/422
10,730,490 B2 * 8/2020 Qiao ................... B60T 8/17558
                        (Continued)

FOREIGN PATENT DOCUMENTS

GB           2548630 A      9/2017

*Primary Examiner* — Phutthiwat Wongwian
*Assistant Examiner* — Susan E Scharpf
(74) *Attorney, Agent, or Firm* — Maginot, Moore & Beck LLP

(57) ABSTRACT

A comfort brake control system and a brake method for a vehicle is disclosed. The comfort brake control system includes: a human-machine interaction interface, configured to provide an interface of multiple optional comfort brake levels of the vehicle, and receive selection of one of the multiple comfort brake levels to switch a current comfort brake level of the vehicle, wherein each comfort brake level comprises a brake parameter corresponding to the comfort brake level, and the brake parameter comprises at least brake pressure and a brake pressure change rate of at least one brake cylinder of the vehicle; and a comfort brake module, configured to determine whether a current state of the vehicle meets a predetermined switching condition; and when it is determined that the switching condition is met, obtain a brake parameter corresponding to a selected comfort brake level, and transmit the obtained brake parameter to a brake system of the vehicle by using a vehicle bus of the vehicle.

13 Claims, 5 Drawing Sheets

(51) Int. Cl.
  *B60T 8/1755* (2006.01)
  *B60T 8/32* (2006.01)
  *B60W 10/18* (2012.01)
  *B60W 40/105* (2012.01)
  *B60W 50/00* (2006.01)
  *B60W 50/08* (2020.01)

(52) U.S. Cl.
  CPC ...... *B60T 2250/04* (2013.01); *B60W 2520/10* (2013.01); *B60W 2710/182* (2013.01); *B60Y 2400/81* (2013.01)

(56) References Cited

U.S. PATENT DOCUMENTS

| | | | | |
|---|---|---|---|---|
| 2004/0254709 | A1* | 12/2004 | Kustosch | B60T 17/22 701/70 |
| 2008/0093179 | A1* | 4/2008 | Jager | B60W 10/184 701/22 |
| 2010/0082195 | A1* | 4/2010 | Lee | B62D 15/0255 701/25 |
| 2015/0100190 | A1* | 4/2015 | Yopp | B60T 8/172 701/23 |
| 2015/0274170 | A1* | 10/2015 | Sun | B60W 10/02 477/92 |
| 2019/0084532 | A1* | 3/2019 | Qiao | B60T 8/17558 |
| 2022/0080942 | A1* | 3/2022 | Eberl | B60W 10/18 |

* cited by examiner

COMFORT BRAKE CONTROL SYSTEM AND CONTROL METHOD FOR VEHICLE

TECHNICAL FIELD

This application claims priority under 35 U.S.C. § 119 to application no. CN 2022 1069 1325.3, filed on Jun. 17, 2022 in China, the disclosure of which is incorporated herein by reference in its entirety.

This application relates to the field of vehicle braking technologies, and in particular, to a comfort brake control system and a comfort brake control method for a vehicle.

BACKGROUND

Recently, research on braking technologies for self-driving vehicles has been very active. The primary focus of the research is on safety and brake efficiency, with relatively little research on user experience. User experience of a self-driving vehicle directly affects user acceptance and trust in the self-driving vehicle, and further affects popularization of the self-driving vehicle.

In an existing brake control solution for a self-driving vehicle, there is no optimal solution for setting a brake policy according to a user requirement. In addition, in the existing brake control solution for a self-driving vehicle, a case in which an actual braking process of the self-driving vehicle deviates from an expected braking process cannot be detected in a timely manner, and therefore, cannot be adjusted in a timely manner.

SUMMARY

In this context, the present disclosure aims to provide a comfort brake control solution for a vehicle, which can implement braking comfort that meets a user requirement.

According to an aspect of the present disclosure, a comfort brake control system for a vehicle is provided, including: a human-machine interaction interface, configured to provide an interface of multiple optional comfort brake levels of the vehicle, and receive selection of one of the multiple comfort brake levels to switch a current comfort brake level of the vehicle, wherein each comfort brake level comprises a brake parameter corresponding to the comfort brake level, and the brake parameter comprises at least brake pressure and/or a brake pressure change rate of at least one brake cylinder of the vehicle; and a comfort brake module, configured to determine whether a current state of the vehicle meets a predetermined switching condition; and when it is determined that the switching condition is met, obtain a brake parameter corresponding to a selected comfort brake level, and transmit the obtained brake parameter to a brake system of the vehicle by using a vehicle bus of the vehicle.

According to another aspect of the present disclosure, a comfort brake control method for a vehicle is provided, where optionally, the method is performed by the foregoing comfort brake control system, and the method includes: providing an interface of multiple optional comfort brake levels of the vehicle, and receiving selection of one of the multiple comfort brake levels to switch a current comfort brake level of the vehicle, wherein each comfort brake level comprises a brake parameter corresponding to the comfort brake level, and the brake parameter comprises at least brake pressure and/or a brake pressure change rate of at least one brake cylinder of the vehicle; determining whether a current state of the vehicle meets a predetermined switching condition; when it is determined that the switching condition is met, obtaining a brake parameter corresponding to a selected comfort brake level; and transmitting the obtained brake parameter to a brake system of the vehicle by using a vehicle bus of the vehicle.

The above gives an overview of the main aspects of the present disclosure in order to allow for a basic understanding of these aspects. This overview is not intended to describe key or important elements of any aspect of the present disclosure, nor is it intended to limit the scope of any or all aspects of the present disclosure. The purpose of this overview is to provide some implementations of these aspects in a simplified form as a preamble to the detailed description given later.

BRIEF DESCRIPTION OF THE DRAWINGS

The technical solutions of the present disclosure are clearer from the following detailed description with reference to the accompanying drawings. It may be understood that these accompanying drawings are merely used for illustration purposes, but are not intended to limit the protection scope of the present disclosure.

DETAILED DESCRIPTION

Embodiments of the present disclosure relate to a vehicle comfort brake control policy, which can allow a user to select a comfort brake level, and implement a user-selected comfort brake level. According to the embodiments of the present disclosure, whether an actual braking process of a vehicle deviates from an expected braking process can be monitored in real time, and when it is detected that the deviation reaches a specific degree, a brake parameter can be adjusted based on a deviation situation, so that the actual braking process of the vehicle is adjusted to be as close as possible to the expected braking process.

The following describes specific implementations of the present disclosure with reference to the accompanying drawings.

Figure 1:
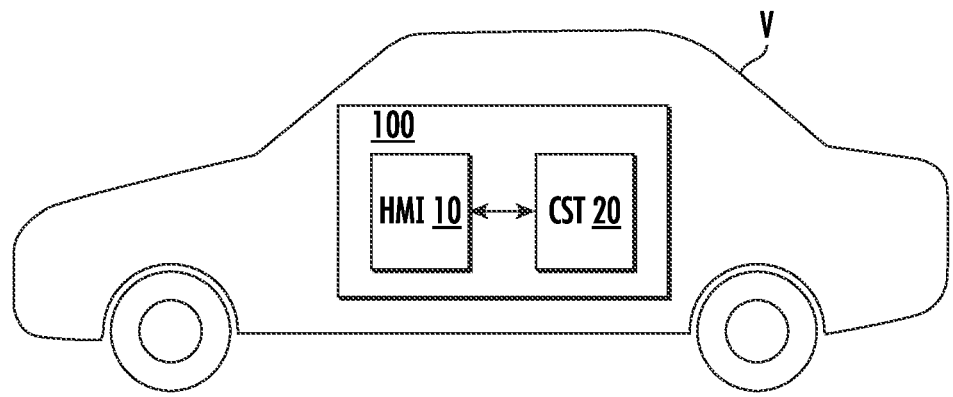
FIG. 1 is a schematic diagram of a comfort brake control system for a vehicle according to an embodiment of the present disclosure.

FIG. 1 schematically shows a comfort brake control system 100 for a vehicle V according to an embodiment of the present disclosure. The comfort brake control system 100 is disposed on the vehicle V. Therefore, the comfort brake control system 100 may also be referred to as an in-vehicle system. As shown in FIG. 1, the comfort brake control system 100 includes a human-machine interaction interface (HMI) 10 and a comfort brake module (CST) 20.

The human-machine interaction interface 10 is communicatively connected to the comfort brake module 20, and is configured to implement information exchange between the vehicle V and an in-vehicle infotainment system by a user.

The human-machine interaction interface 10 may receive user input, and transmit the user input to the comfort brake module 20. The human-machine interaction interface 10 may further provide the user with information related to vehicle comfort brake. For example, a graphical user interface that enables the user to select a comfort brake level is presented to the user, or voice related to comfort brake is broadcast to the user.

The human-machine interaction interface 10 may implement information exchange between the user in the vehicle and the in-vehicle infotainment system by using multiple human-machine interaction manners, for example, one or more of a touchscreen, voice, action recognition (for example, gesture recognition), and a physical button.

In an embodiment, the human-machine interaction interface 10 includes one or more of the following: a central control screen of the vehicle V (for example, the user expresses, by touching the central control screen, a vehicle brake requirement of the user), a voice control system (for example, the user expresses, via voice, a vehicle brake requirement of the user), a gesture recognition system (for example, the user expresses, by using a predefined gesture, a vehicle brake requirement of the user), and a button or a knob disposed at a position convenient for the user in the vehicle to operate (for example, the user expresses, by operating the button or the knob, a vehicle brake requirement of the user).

The comfort brake module 20 implements a comfort brake function based on information from the human-machine interface 10 and information about one or more in-vehicle sensors (not shown), for example, switches a comfort brake level according to a user requirement, and self-adjusts a brake parameter when an actual braking process deviates from an expected braking process.

The comfort brake module 20 may be disposed in a control unit of a self-driving system of the vehicle V, or may be disposed in a domain controller of the vehicle V, or may be disposed in a control unit of a brake system of the vehicle V.

Multiple comfort brake levels are stored in the comfort brake module 20. The multiple comfort brake levels are predetermined and respectively correspond to different comfort levels in the braking process of the vehicle V. For example, the multiple comfort brake levels may include a high comfort brake level, a medium comfort brake level, and a low comfort brake level. The high comfort brake level indicates highest (for example, smoothest) comfort during braking. The medium comfort brake level indicates medium comfort during braking (e.g. medium smooth). The low comfort brake level indicates moderate comfort during braking (for example, there is still slight shaking during stopping).

In an embodiment, a quantity of comfort brake levels is predetermined, e.g., it is predetermined that there are six comfort brake levels. The quantity of comfort brake levels can be adjusted to more or less depending on user requirements before a new vehicle is delivered from factory or after the vehicle has been factory reset.

Each comfort brake level contains a brake parameter that corresponds to the comfort brake level. For example, the high comfort brake level includes a brake parameter corresponding to the high comfort brake level. The medium comfort brake level includes a brake parameter corresponding to the medium comfort brake. In addition, the low comfort brake level includes a brake parameter corresponding to the low comfort brake level.

The brake parameter includes one or more brake parameters directly or indirectly related to vehicle braking. The brake parameter may include brake pressure of at least one braking cylinder and a brake pressure change rate of the vehicle V. The brake pressure may be brake pressure of any one of multiple brake cylinders of the vehicle V, or may be a sum or an average value of brake pressures of the multiple brake cylinders. The brake parameter may further include a speed of the vehicle V during braking and an acceleration of the vehicle V during braking. Each brake parameter may be a variable throughout the braking process, for example, the brake parameter may be expressed as a curve that varies with time during the braking process.

Figure 2:
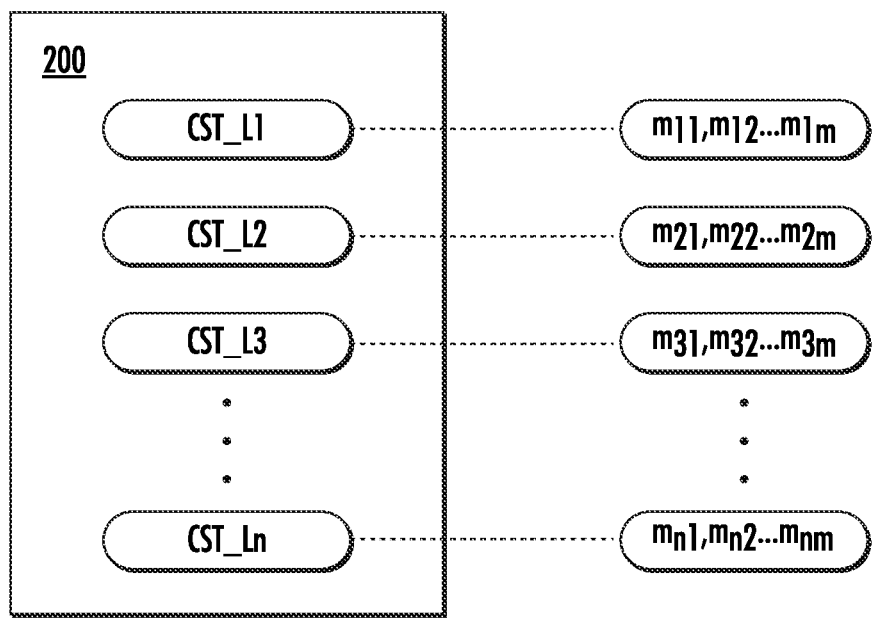
FIG. 2 is a schematic diagram of a comfort brake level according to an embodiment of the present disclosure.

FIG. 2 schematically shows a comfort brake level according to an embodiment of the present disclosure. Referring to FIG. 2. the vehicle V has multiple optional comfort brake levels CST_L1, CST_L2, CST_L3, and CST_Ln. Each comfort brake level includes a brake parameter corresponding to the level, that is, the comfort brake level CST_L1 includes corresponding brake parameters $m_{11}$, $m_{12}$, $m_{13}$, . . . , and $m_{1m}$. The comfort brake level CST_L2 includes corresponding brake parameters $m_{21}$, $m_{22}$, $m_{23}$, . . . , and $m_{2m}$, and the comfort brake level CST_Ln includes corresponding brake parameters $m_{n1}$, $m_{n2}$, $m_{n3}$, . . . , and $m_{nm}$.

In an embodiment, the human-machine interaction interface 10 is implemented as a touchscreen. A graphical user interface 200 that includes the multiple comfort brake levels is presented on the touchscreen. The graphical user interface 200 includes multiple buttons, and each button corresponds to one comfort brake level. These buttons can receive user input, that is, the user can click a button to select a comfort brake level corresponding to the button. The human-machine interaction interface 10 receives user input, and transmits the received user input to the comfort brake module 20.

In another embodiment, the human-machine interaction interface 10 is implemented as a voice interaction interface. The voice interaction interface may receive voice input of the user, so that the user selects one of the multiple comfort brake levels. For example, the user indicates, via speaking, selecting of the high comfort brake level: "High comfort brake level" or "please switch to high comfort brake". The human-machine interaction interface 10 receives the voice input, and transmits the user input to the comfort brake module 20.

The comfort brake module 20 may be implemented by using hardware, software, or a combination of software and hardware. Parts implemented by hardware may be implemented in one or more application-specific integrated circuits (ASIC), digital signal processors (DSP), data signal processing devices (DSPD), programmable logic devices (PLD), field programmable gate arrays (FPGA), processors, controllers, microcontrollers, microprocessors, electronic units designed to perform functions thereof, or combinations thereof. Parts implemented by software may be implemented by using microcode, program code, or a code section, or may be stored in a machine-readable storage medium such as a storage component.

In an embodiment, the comfort brake module 20 includes a memory and a processor. The memory includes instructions, and when the instructions are executed by the processor, the processor performs the comfort brake control policy/comfort brake control method according to this embodiment of the present disclosure.

Figure 3:
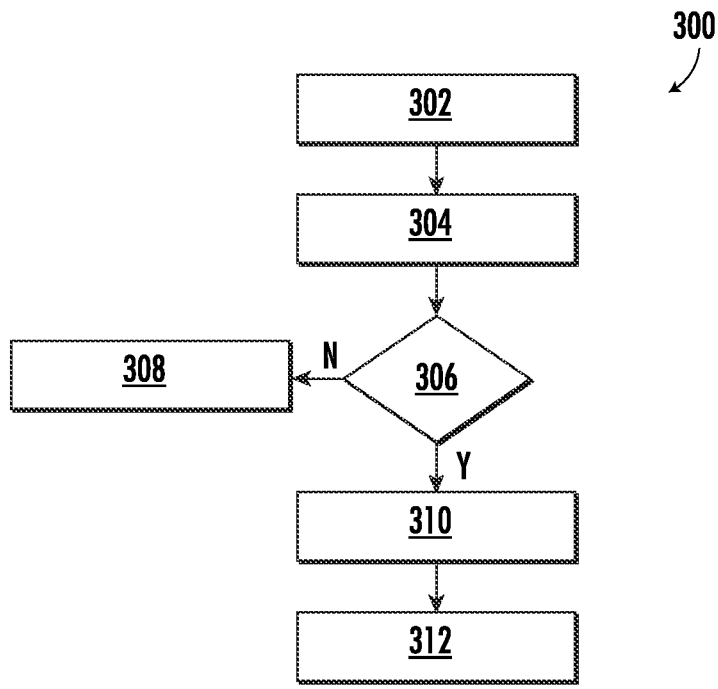
FIG. 3 is a flowchart of a comfort brake control process according to an embodiment of the present disclosure.

FIG. 3 shows a comfort brake control process 300 according to an embodiment of the present disclosure. According to the process 300, the user may switch the comfort brake level of the vehicle V, that is, switch the current comfort brake level of the vehicle V to another comfort brake level.

Referring to FIG. 3, in block 302, the human-machine interaction interface 10 provides an interface representing multiple optional comfort brake levels.

The interface may be a graphical user interface (for example, the graphical user interface 200 shown in FIG. 2). For example, the graphical user interface is presented on the touchscreen and includes button icons of multiple optional comfort brake levels. The current comfort brake level is marked on the graphical user interface. For example, a button icon of the current comfort brake level is distinguished from a button icon of another comfort brake level by using color. The interface may also be a voice interaction interface. For example, the voice interaction interface broadcasts audio: "This vehicle has six comfort brake levels, and the current comfort brake level is level 3."

In block 304, the human-machine interaction interface 10 receives user input for the user to select one of the multiple comfort brake levels, thereby switching the current comfort brake level. Corresponding to the foregoing interface implementation, the user input may include: The user touches a button icon by using a hand, and selects a comfort brake level that is corresponding to the button icon and to which the user wants to switch. The user input can also include the user saying, "Please switch to comfort brake level 5."

It may be understood that if the user wants to keep the current comfort brake level, that is, does not switch the current comfort brake level, the process 300 ends. The user may express, by touching a button icon of "do not switch" or saying "do not switch," willingness of the user to keep the current comfort brake level.

In block 306, in response to the received user input for switching the current comfort brake level, the comfort brake module 20 determines whether a current state of the vehicle V meets a predetermined switching condition.

The switching condition mainly involves: Whether the vehicle V has enough time to transmit, to the brake system of the vehicle V by using the vehicle bus, the brake parameter of the level to which the vehicle V wants to switch, because if the vehicle V does not have enough time to transmit the brake parameter, switching the comfort brake level cannot be implemented. For example, if the vehicle V needs to start braking immediately, and does not complete transmission of the brake parameter in a timely manner, in this case, the comfort brake module 20 determines that the current state of the vehicle V does not meet the predetermined switching condition.

In an embodiment, the predetermined switching condition is that the vehicle V is in a stationary state.

In this embodiment, if the current state of the vehicle V is the stationary state, the comfort brake module 20 determines that the current state meets the predetermined switching condition. If the current state of the vehicle V is a non-stationary state, the comfort brake module 20 determines that the current state does not meet the predetermined switching condition.

In another embodiment, the predetermined switching condition is that duration away from the moment at which the vehicle V starts braking is greater than predetermined duration (for example, predetermined first duration, that is, predetermined duration away from the moment at which braking). The predetermined duration is associated with duration required for transmitting the brake parameter to the brake system by using the vehicle bus. The preset duration may be equal to duration required for transmitting the brake parameter to the brake system by using the vehicle bus, or may be slightly greater than the duration, so that there is a specific reservation amount. In this embodiment, if the duration away from the moment at which the vehicle V starts braking is greater than the predetermined duration, the comfort brake module 20 determines that the current state meets the predetermined switching condition. If the duration away from the moment at which the vehicle V starts braking is not greater than the predetermined duration, the comfort brake module 20 determines that the current state does not meet the predetermined switching condition.

In the embodiments of the present disclosure, "start braking" refers to a moment at which the vehicle starts braking (that is, starts comfort braking). For example, if the vehicle is traveling at a higher speed and a braking decision has been made, the speed decreases and the braking starts when the speed decreases to a specific speed. It may be understood that the "start braking" moment is predetermined, for example, calculated based on a real vehicle test result and/or a model. The "start braking" moment may be adjusted, for example, adjusted according to a vehicle brand, a user requirement, or a specific application scenario.

A case in which the duration away from the moment at which the vehicle V starts braking is greater than the predetermined duration is that the vehicle is not in a braking process and the current vehicle speed is greater than a predetermined vehicle speed, so that duration from the current vehicle speed to the vehicle speed at which braking starts is greater than the predetermined duration. In other words, the current vehicle speed needs to be higher than the predetermined vehicle speed, so that the time period from the current vehicle speed to the vehicle speed at which braking starts is sufficient to transmit the brake parameter.

It may be understood that a self-driving system of the vehicle V may calculate, according to vehicle status information sensed by an in-vehicle sensor, the duration away from the moment at which the vehicle V starts braking. The method for calculating the duration is not limited in the present disclosure.

If it is determined in block 306 that the current state of the vehicle V does not meet the predetermined switching condition, the process 300 proceeds to block 308.

In block 308, the comfort brake module 20 prohibits switching the comfort brake level. In addition, the human-machine interaction interface 10 provides, on the touchscreen or via voice, the user with information that "the current state of the vehicle V is not suitable for switching the comfort brake level."

If it is determined in block 306 that the current state of the vehicle V meets the predetermined switching condition, the process 300 proceeds to block 310.

In block 310, the comfort brake module 20 obtains a brake parameter corresponding to a comfort brake level selected by the user. For example, if the user selects comfort brake level 5, the comfort brake module 20 obtains a brake parameter corresponding to comfort brake level 5.

In block 312, the comfort brake module 20 transmits the obtained brake parameter to the brake system of the vehicle V by using the vehicle bus, so that the brake system steers the braking process of the vehicle V according to the brake parameter.

Figure 4:
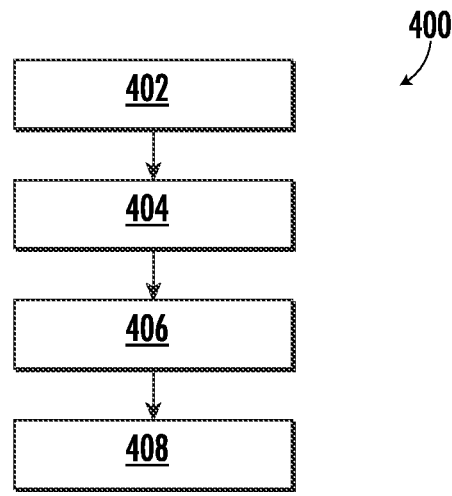
FIG. 4 is a flowchart of a comfort brake control process according to another embodiment of the present disclosure.

FIG. 4 shows a comfort brake control process 400 according to another embodiment of the present disclosure. According to the process 400, the user may complete activation of the comfort brake function of the vehicle V, and complete initial experience of the comfort brake function under guidance of the comfort brake control system 100.

Referring to FIG. 4, in block 402, after the vehicle V is initialized, the human-machine interaction interface 10 provides the user of the vehicle V with information indicating that the vehicle V has a comfortable braking function and has multiple comfort brake levels. The initialization may include at least one of the following cases: When a new vehicle is delivered, a functional unit of the vehicle V (for example, a functional unit of the brake system of the vehicle V and a functional unit of a self-driving system of the vehicle V) is activated or updated; and a functional unit of the vehicle V (for example, the functional unit of the brake system of the vehicle V and the functional unit of the self-driving system) is activated or updated when factory reset is performed. After such initialization, multiple functions and corresponding function parameters of the vehicle V are in a factory setting state.

In an embodiment, the human-machine interaction interface 10 broadcasts such information to the user via voice: "This vehicle has a comfortable braking function, and has six optional comfort brake levels".

In another embodiment, the human-machine interaction interface 10 presents information such as "This vehicle has a comfortable braking function and has six optional comfort brake levels" on the touchscreen.

In block 404, the human-machine interaction interface 10 receives user input for the user to express enabling of the comfort brake function. For example, the user enters or says "Please turn on the comfort brake function" on the touchscreen.

In block 406, the comfort brake module 20 is activated in response to the user input above. After the comfort brake module 20 is activated, the braking process of the vehicle V has a comfort brake feature, that is, the braking process of the vehicle V can be implemented as a comfort brake process.

In block 408, the human-machine interaction interface 10 guides the user through the initial experience of comfort brake. For example, after the comfort brake module 20 is activated, the human-machine interaction interface 10 may provide the user with the following information in a form of a graphical user interface or via voice: Aspects included in the comfort brake function of the vehicle; options that can be set or adjusted; precautions; and emergency response measures. In addition, the human-machine interaction interface 10 may further guide, in a form of a graphical user interface or via voice, the user to complete the initial experience of comfort brake step by step.

Figure 5:
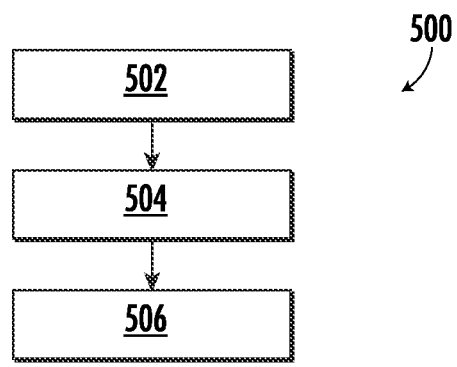
FIG. 5 is a flowchart of a comfort brake control process according to still another embodiment of the present disclosure.
Figure 6:
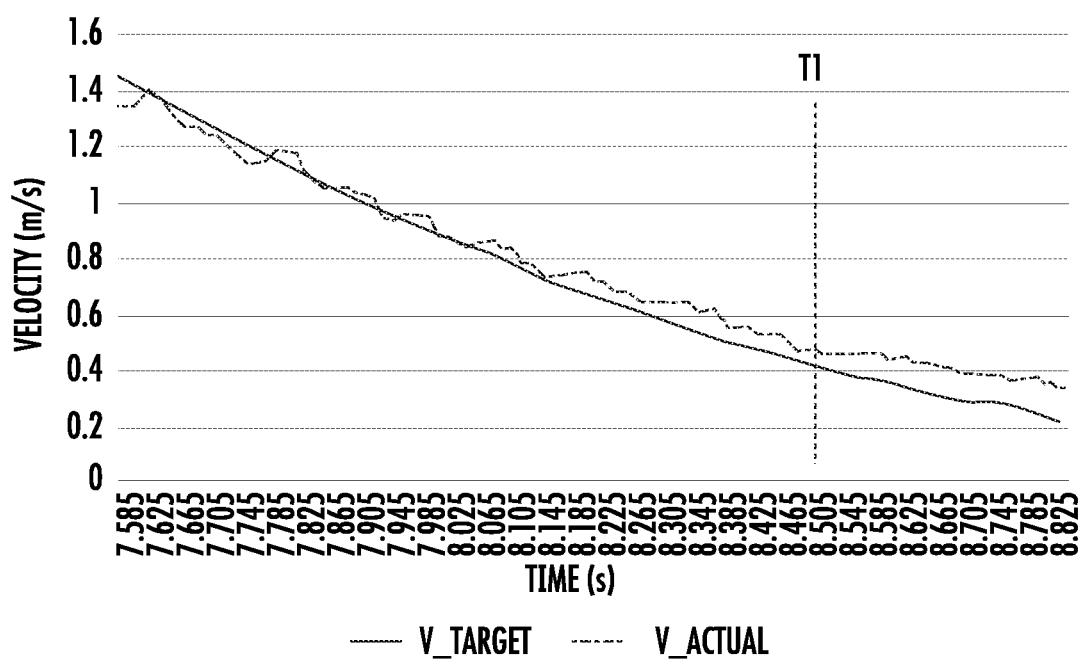
FIG. 6 is an example of a curve graph used in the comfort brake control process in FIG. 5.

FIG. 5 shows a comfort brake control process 500 according to still another embodiment of the present disclosure. According to the process 500, the comfort brake module 20 adjusts brake pressure based on a speed difference between an actual vehicle speed and an expected vehicle speed of the vehicle V, so that the actual vehicle speed is as close as possible to the expected vehicle speed. FIG. 6 is an example of a curve graph used in the process 500. In FIG. 6, the horizontal coordinate represents time of the braking process (for example, the braking process starts at about 7.585 seconds, ends at about 8.825 seconds, and the entire braking process lasts for about 1.3 seconds). The vertical coordinate represents the vehicle speed. The black curve indicates the expected vehicle speed (V_Target) of the vehicle V during braking. The gray curve shows the actual vehicle speed (V_Actual) of the vehicle V during braking. The expected vehicle speed may be obtained in advance by using a real vehicle test result and/or through model calculation. The expected vehicle speed (V_Target) is, for example, expressed as a curve indicating that the expected vehicle speed varies with time, and is pre-stored in the comfort brake module 20.

The following describes the process 500 with reference to FIG. 5 and FIG. 6.

In block 502, the comfort brake module 20 obtains the actual vehicle speed of the vehicle V in the braking process, for example, an actual vehicle speed curve in FIG. 6. The actual vehicle speed may be measured by the in-vehicle sensor, and is transmitted from the in-vehicle sensor to the comfort brake module 20 by using the vehicle bus.

In block 504, the comfort brake module 20 calculates a speed difference between the actual vehicle speed and the expected vehicle speed. For example, the actual vehicle speed curve in FIG. 6 is subtracted from the expected vehicle speed curve, to obtain the vehicle speed difference. It may be understood that the vehicle speed difference may also be expressed as a curve (not shown in the figure) of the vehicle speed difference changing over time.

In block 506, the comfort brake module 20 adjusts the brake pressure in the brake parameter at the current comfort brake level based on the calculated speed difference to reduce the speed difference.

At a moment during braking, if the actual vehicle speed is greater than the expected vehicle speed at the moment, it indicates that the brake pressure is insufficient, and the actual vehicle speed does not decrease to the expected value that should be reached at the moment. In this case, the brake pressure should be increased. In addition, if the actual vehicle speed at the moment is less than the expected vehicle speed at the moment, it indicates that the brake pressure is excessively high, and the actual vehicle speed decreases to a vehicle speed lower than the expected value that should be reached at the moment, and in this case, the brake pressure should be reduced. Further, if the actual vehicle speed at the moment is equal to the corresponding expected vehicle speed at the moment, it indicates that the brake pressure is exactly proper and does not need to be adjusted.

In an embodiment, a moment at which the vehicle speed needs to be reduced to the predetermined vehicle speed may be used as a sampling point for calculating the vehicle speed difference. For example, referring to FIG. 6, a moment at which the expected vehicle speed is 0.4 m/s (that is, a moment at which the vehicle speed should be reduced to a smaller value when the braking process is to end) is used as a sampling point. The sampling point may be determined in this manner: a predetermined moment (for example, moment T1 corresponding to the expected vehicle speed 0.4 m/s in FIG. 6) after predetermined duration after the vehicle V starts braking (for example, predetermined second duration, that is, predetermined braking duration). The preset duration may be calculated in advance by the self-driving system of the vehicle V. The method for calculating the preset duration is not limited in the present disclosure.

In this embodiment, the comfort brake module 20 calculates the vehicle speed difference between the actual vehicle speed and the corresponding expected vehicle speed at the predetermined moment after the predetermined duration after braking starts.

If the vehicle speed difference at the predetermined moment is positive, and an absolute value of the vehicle speed difference exceeds a first vehicle speed difference threshold, the brake pressure is increased. If the vehicle speed difference at the predetermined moment is negative, and the absolute value of the vehicle speed difference exceeds a second vehicle speed difference threshold, the brake pressure is reduced.

Herein, the first vehicle speed difference threshold and the second vehicle speed difference threshold are specified to eliminate interference caused by a small difference due to a factor such as a system error. In this way, if a small speed difference occurs, brake pressure adjustment is not triggered. The first vehicle speed difference threshold and the second vehicle speed difference threshold are obtained in advance based on a real vehicle test result and/or model calculation. The first and second vehicle speed difference thresholds may be the same or may be different.

In this embodiment, in the case in which the brake pressure is increased, the comfort brake module 20 may increase the brake pressure by a first increment unit or a second increment unit one or more times. The first increment unit is less than the second increment unit. In this way, when determining to increase the brake pressure, the comfort brake module may further choose, based on the speed difference, to increase the brake pressure by a larger increment (the second increment unit) or by a smaller increment (the first increment unit). In addition, each time the brake pressure is increased, the comfort brake module 20 obtains a new actual vehicle speed and calculates a new speed difference, and then adjusts the brake pressure based on the new speed difference.

Similarly, in the case in which the brake pressure is reduced, the comfort brake module may reduce the brake pressure by a first decrement unit or a second decrement unit one or more times. The first decrement unit is less than the second decrement unit. In this way, when determining to reduce the brake pressure, the comfort brake module 20 may further choose, based on the speed difference, to reduce the brake pressure by a larger decrement (the second decrement unit) or a smaller decrement (the first decrement unit). In addition, each time the brake pressure is reduced, the comfort brake module 20 obtains a new actual vehicle speed and calculates a new speed difference, and then adjusts the brake pressure based on the new speed difference.

In addition, for safety reasons, the brake pressure should be reduced slowly. Therefore, the first or second decrement unit should be set to a smaller value to adequately ensure safety.

Figure 7:
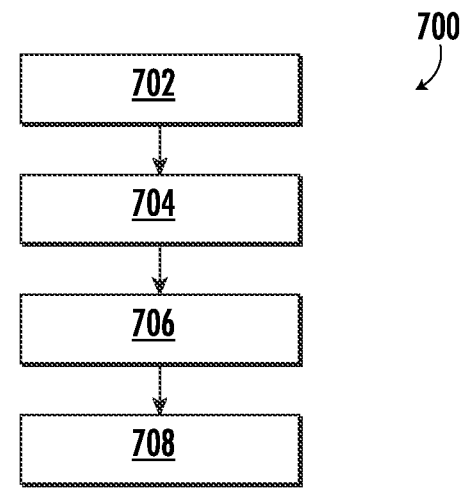
FIG. 7 is a flowchart of a comfort brake control process according to yet another embodiment of the present disclosure.
Figure 8:
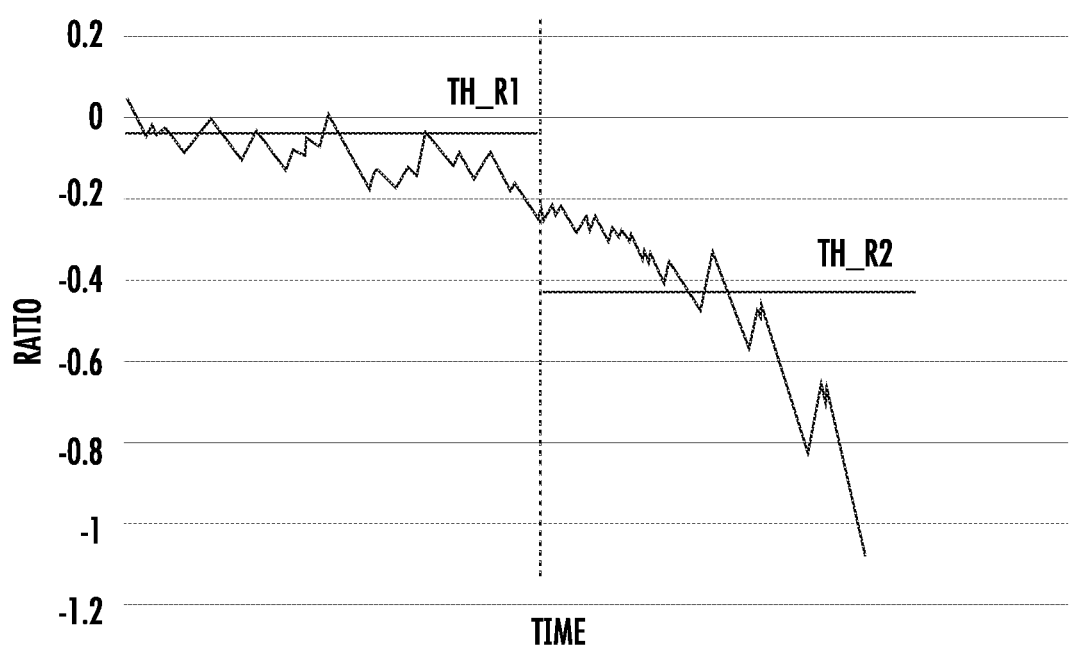
FIG. 8 is an example of a curve graph used in the comfort brake control process in FIG. 7.

FIG. 7 shows a comfort brake control process 700 according to yet another embodiment of the present disclosure. According to the process 700, the comfort brake module 20 adjusts the brake pressure change rate based on the foregoing ratio of the vehicle speed difference to the expected vehicle speed. FIG. 8 is an example of a curve graph used in the process 700. In FIG. 8, the horizontal coordinate represents the time of the braking process. The vertical coordinate represents the ratio. The curve shows how the ratio changes over time.

The following describes the process 700 with reference to FIG. 7 and FIG. 8.

In block 702, the comfort brake module 20 calculates the ratio of the foregoing vehicle speed difference to the expected vehicle speed. For example, the expected vehicle speed curve is subtracted from the actual vehicle speed curve, and then divided by the expected vehicle speed curve to obtain the ratio curve in FIG. 8.

In block 704, the comfort brake module 20 divides the entire braking process into multiple sections. A quantity of sections obtained by way of division may be adjusted, and duration of each section may be the same or may be different. For example, referring to FIG. 8, a dashed line is used to indicate that the entire process is divided into two sections, that is, a high-speed section in the first half part and a low-speed section in the second half part. Duration of the high-speed section may be the same as or different from duration of the low-speed section. For example, the location of the dashed line may be the middle location of the entire braking process, or may be the location at ⅓ of the entire braking process.

In an embodiment, the comfort brake module 20 divides the entire braking process into a high-speed section, a medium-speed section, and a low-speed section according to vehicle speeds, and duration of each section is equal.

In block 706, the comfort brake module 20 sets a ratio threshold for each section. The lower the vehicle speed, the higher the ratio threshold for the section. A reason for this setting is as follows: A smaller vehicle speed indicates a more obvious change in the change rate. For example, referring to FIG. 8, the comfort brake module 20 sets a ratio threshold TH_R1 for the high-speed section in the first half part, and sets a ratio threshold TH_R2 for the low-speed section in the second half part, and an absolute value of TH_R2 is greater than an absolute value of TH_R1.

In an embodiment, the comfort brake module 20 generates a curve (shown in the figure) of the ratio threshold changing over time.

In block 708, for each section, the comfort brake module 20 calculates a difference between a ratio of the section and a ratio threshold of the section and adjusts the brake pressure change rate in the brake parameter at the current comfort brake level based on the calculated difference.

If the calculated difference is positive, it indicates that pressure relief is too fast, and the brake pressure change rate should be reduced to make pressure relief slower. If the calculated difference is negative, it indicates that the pressure relief is too slow, and the brake pressure change rate should be increased to make pressure relief faster. Because multiple sections are obtained through division, a quantity of sections with positive differences and a quantity of sections with negative differences may be statistically determined, and a larger quantity is used.

In an embodiment, the comfort brake module 20 determines the quantity of sections with positive differences and the quantity of sections with negative differences. If the quantity of sections with positive differences is greater than the quantity of sections with negative differences, the brake pressure change rate is decreased by a third decrement unit. If the quantity of sections with positive differences is less than the quantity of sections with negative differences, the brake pressure change rate is increased by a third increment unit.

In this embodiment, if the quantity of sections with positive differences is equal to the quantity of sections with negative differences, a sampling point is added, for example, an intermediate moment of the braking process is used as a sampling point.

The comfort brake module 20 calculates a difference between a ratio of the intermediate moment and a ratio threshold at the moment (for example, obtains the ratio threshold at the moment from the foregoing curve of the ratio threshold); if the difference is positive, decreases the brake pressure change rate by the third decrement unit; and if the difference is negative, increases the brake pressure change rate by the third increment unit.

Considering that the vehicle has a risk of slipping when pressure relief is excessively fast, the third increment unit that makes the pressure relief speed increase should be set to a smaller value. In this way, there is no risk of vehicle slipping because the pressure relief speed increases too much.

During use of the vehicle V, a deviation between an actual braking process and an expected braking process may occur. For example, software update of the vehicle V, wear of hardware of the vehicle V, over-the-air upgrade of the functional unit of the vehicle V, or degradation of the in-vehicle sensor of the vehicle V may cause the deviation between the actual braking process and the expected braking process. According to the foregoing process 500 and process 700, whether the deviation occurs can be detected, and when it is detected that the deviation occurs, self-adjustment of the deviation is implemented by adjusting the brake parameter. In this way, the comfort brake function of the vehicle V can be in good performance and robustness for a long time.

In this embodiment of the present disclosure, the user of the vehicle can switch the comfort brake level of the vehicle. For example, the user may include a driver and a passenger of the vehicle V, an operator of a 4S store, and an engineer of an OEM.

The embodiments of the present disclosure are applicable to a self-driving vehicle or a vehicle that has a self-driving capability. Herein, "the self-driving vehicle" or "the vehicle that has a self-driving capability" refers to a vehicle that is constructed to perform an operation without continuous intervention (for example, steering, accelerating, or braking) from a driver. "Self-driving" may include partial self-driving (for example, self-driving with a safety officer on a self-driving vehicle or with occasional human intervention) and full self-driving (for example, self-driving without a safety officer on a self-driving vehicle or without any human driver intervention). The self-driving capability of the vehicle may be implemented by using an advanced driving assistance system or an autonomous driving system that is disposed on the vehicle.

Figure 9:
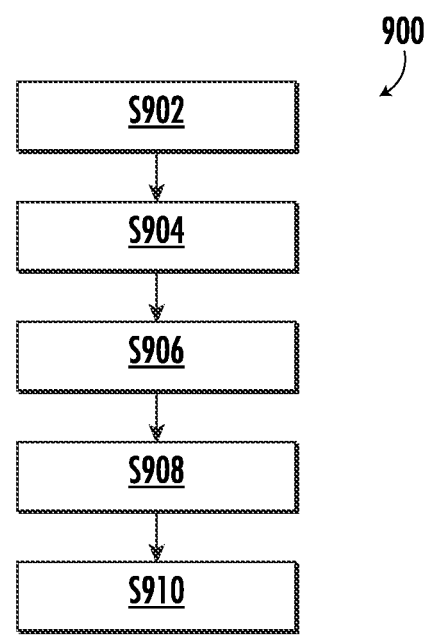
FIG. 9 is a flowchart of a comfort brake control method according to an embodiment of the present disclosure.

FIG. 9 shows a comfort brake control method 900 according to an embodiment of the present disclosure. The method 900 may be implemented by using the foregoing system 100, and therefore the foregoing description about the system 100 is also applicable to this method.

Referring to FIG. 9, in step S902, the human-machine interaction interface 10 provides an interface of multiple optional comfort brake levels of the vehicle V.

In step S904, the human-machine interaction interface 10 receives selection of one of the multiple comfort brake levels, so as to switch a current comfort brake level of the vehicle. Each comfort brake level includes a brake parameter corresponding to the comfort brake level, and the brake parameter includes at least brake pressure and a brake pressure change rate of at least one brake cylinder of the vehicle V.

In step S906, the comfort brake module 20 determines whether a current state of the vehicle V meets a predetermined switching condition.

In step S908, when it is determined that the switching condition is met, the comfort brake module 20 obtains a brake parameter corresponding to the selected comfort brake level.

In step S910, the comfort brake module 20 transmits the obtained brake parameter to a brake system of the vehicle V by using a vehicle bus of the vehicle V.

Although some implementations are described above, these implementations are provided by way of example only, and are not intended to limit the scope of the present disclosure. The appended claims and their equivalents are intended to cover all modifications, substitutions and changes made within the scope and subject matter of the present disclosure.

What is claimed is:

1. A comfort brake control system for a vehicle, comprising:
   a human-machine interaction interface, configured to provide an interface of multiple optional comfort brake levels of the vehicle, and receive selection of one of the multiple comfort brake levels to switch a current comfort brake level of the vehicle, wherein each comfort brake level comprises a brake parameter corresponding to the comfort brake level, and the brake parameter comprises at least brake pressure and/or a brake pressure change rate of at least one brake cylinder of the vehicle; and
   a comfort brake module, configured to determine whether a current state of the vehicle meets a predetermined switching condition; and when it is determined that the switching condition is met, obtain a brake parameter corresponding to a selected comfort brake level, and transmit the obtained brake parameter to a brake system of the vehicle by using a vehicle bus of the vehicle.

2. The comfort brake control system according to claim 1, wherein the predetermined switching condition is one of:
   the vehicle is in a stationary state; and
   a duration away from the moment at which the vehicle starts braking is greater than a predetermined duration, and the predetermined duration is associated with a duration required for transmitting the brake parameter to the brake system by using the vehicle bus.

3. The comfort brake control system according to claim 1, wherein:
   the comfort brake module is configured to store an expected vehicle speed in a braking process of the vehicle; and
   the comfort brake module is further configured to:
      obtain an actual vehicle speed of the vehicle in the braking process;
      calculate a speed difference between the actual vehicle speed and the expected vehicle speed; and
      adjust brake pressure in the brake parameter based on the calculated speed difference to reduce the speed difference.

4. The comfort brake control system according to claim 3, wherein:
   calculating the vehicle speed difference comprises: calculating a vehicle speed difference between an actual vehicle speed and a corresponding expected vehicle speed at a predetermined moment after a predetermined duration passes since braking starts; and
   adjusting the brake pressure comprises: if the vehicle speed difference at the predetermined moment is positive, and exceeds a first vehicle speed difference threshold, increasing the brake pressure; and if the vehicle speed difference at the predetermined moment is negative, and exceeds a second vehicle speed difference threshold, reducing the brake pressure.

5. The comfort brake system according to claim 4, wherein:
   increasing the brake pressure comprises: increasing the brake pressure by a first increment unit or a second increment unit greater than the first increment unit; and
   reducing the brake pressure comprises: reducing the brake pressure by using a first decrement unit or a second decrement unit greater than the first decrement unit.

6. The comfort brake control system according to claim 3, wherein:
adjusting the brake pressure comprises: adjusting the brake pressure one time or multiple times; and
in the case of multiple times of adjustment, re-obtaining the actual vehicle speed after each time of adjustment, calculating a new vehicle speed difference, and adjusting the brake pressure based on the new vehicle speed difference.

7. The comfort brake control system according to claim 3, wherein the comfort brake module is further configured to:
calculate a ratio of the vehicle speed difference to the expected vehicle speed;
divide the entire braking process into multiple sections;
set a ratio threshold for a ratio of each section; and
for each section, calculate a difference between the ratio of the section and the ratio threshold of the section, and adjust the brake pressure change rate in the brake parameter based on the difference.

8. The comfort brake system according to claim 7, wherein adjusting the brake pressure change rate comprises:
determining a quantity of sections with positive differences and a quantity of sections with negative differences;
if the quantity of sections with positive differences is greater than the quantity of sections with negative differences, reducing the brake pressure change rate by a third decrement unit; and
if the quantity of sections with positive differences is less than the quantity of sections with negative differences, increasing the brake pressure change rate by a third increment unit;
wherein the third increment unit is less than the third decrement unit.

9. The comfort brake control system according to claim 7, wherein setting the ratio threshold for each section comprises: setting a larger ratio threshold for a section with a lower vehicle speed.

10. The comfort brake control system according to claim 1, wherein:
the human-machine interaction interface is further configured to: after the vehicle is initialized,
provide, for a user of the vehicle, information indicating that the vehicle has a comfort brake function and has the multiple comfort brake levels; and
the comfort brake module is further configured to be activated in response to the user selecting the comfort brake function;
wherein the initialization comprises at least one of the following:
activating or updating a functional unit of a new vehicle during delivery of the vehicle; and
activating or updating the functional unit during factory reset.

11. The comfort brake control system according to claim 1, wherein:
the comfort brake control system is disposed in the vehicle;
the human-machine interaction interface comprises at least one of the following: a voice interaction interface, a touchscreen, and a physical button; and
the comfort brake module is disposed in a control unit of the brake system of the vehicle or disposed in a domain controller of the vehicle.

12. A comfort brake control method for a vehicle, comprising:
providing an interface of multiple optional comfort brake levels of the vehicle;
receiving selection of one of the multiple comfort brake levels to switch a current comfort brake level of the vehicle, wherein each comfort brake level comprises a brake parameter corresponding to the comfort brake level, and the brake parameter comprises at least brake pressure and/or a brake pressure change rate of at least one brake cylinder of the vehicle;
determining whether a current state of the vehicle meets a predetermined switching condition;
when it is determined that the switching condition is met, obtaining a brake parameter corresponding to a selected comfort brake level; and
transmitting the obtained brake parameter to a brake system of the vehicle by using a vehicle bus of the vehicle.

13. The comfort brake control method of claim 12, wherein providing an interface and receiving the selection is performed by a human machine interaction interface and the determination is performed by a comfort brake module.

* * * * *